(No Model.) 5 Sheets—Sheet 1.

G. J. ALTHAM.
POWER TRANSMITTER.

No. 599,546. Patented Feb. 22, 1898.

WITNESSES:
A. D. Harris
P. W. Pezzetti

INVENTOR:
Geo. J. Altham
by Wright, Brown & Quinby
Attys

(No Model.)   5 Sheets—Sheet 3.

G. J. ALTHAM.
POWER TRANSMITTER.

No. 599,546.   Patented Feb. 22, 1898.

WITNESSES:
A. D. Harrison
P. W. Pezzetti

INVENTOR:
Geo. J. Altham
by Wright, Brown & Quinby
Attys (No Model.) 5 Sheets—Sheet 4.

G. J. ALTHAM.
POWER TRANSMITTER.

No. 599,546. Patented Feb. 22, 1898.

WITNESSES:
A. D. Harrison
P. W. Pezzette INVENTOR:
Geo. J. Altham
by Wright, Brown & Quinby
Attys.

(No Model.) 5 Sheets—Sheet 5.

G. J. ALTHAM.
POWER TRANSMITTER.

No. 599,546. Patented Feb. 22, 1898.

WITNESSES:
INVENTOR:

UNITED STATES PATENT OFFICE.

GEORGE J. ALTHAM, OF FALL RIVER, MASSACHUSETTS.

POWER-TRANSMITTER.

SPECIFICATION forming part of Letters Patent No. 599,546, dated February 22, 1898.

Application filed April 17, 1897. Serial No. 632,628. (No model.)

*To all whom it may concern:*

Be it known that I, GEORGE J. ALTHAM, of Fall River, in the county of Bristol and State of Massachusetts, have invented certain new and useful Improvements in Power-Transmitters, of which the following is a specification.

This invention has relation to power-transmitting mechanisms, and is principally designed for use on a vehicle propelled by an oil or gas motor for imparting power from the motor-shaft to the shaft on which the driving-wheels of the vehicle are placed. It is essential in motor-vehicles of this type in which an oil or gas engine is employed that it should not be necessary to vary the speed of the engine and therefore that the driving mechanism should be under the immediate control of an operator and should be capable of such adjustment that the vehicle might be propelled at any desirable rate of speed, and also that the mechanism should be capable of rotating the driving-wheels in either direction without affecting or reversing the motor or power shaft or the motor.

My invention therefore consists of a power-transmitter having certain features of construction and arrangement, such as illustrated upon the drawings and now to be described in detail, and pointed out in the claims, whereby the speed of the driven shaft may be gradually varied from minimum to maximum, though the motor or power shaft be rotating at its normal rate of speed, and whereby the direction of rotation of the said driven shaft may be reversed practically instantly without a corresponding reversal of the direction of rotation of the power-shaft.

The invention also consists in other improvements, all as will now be explained.

Reference is to be had to the accompanying drawings and to the letters marked thereon, forming a part of this specification, the same letters designating the same parts or features, as the case may be, wherever they occur.

As I have previously stated, my invention is particularly applicable for use on vehicles employing oil or gas motors, and has been designed by me especially for the purpose of transmitting power from the motor-shaft thereof to the shaft on which the driving-wheels are mounted. I have not deemed it necessary, however, to illustrate upon the drawings any of the parts of such a vehicle or the motor therefor, and have consequently shown two shafts (indicated by *a b*, respectively) and term them the "motor," "power," or "driving" shaft and the "driven" shaft, with the understanding that the first may be either the shaft of the motor itself or a shaft driven thereby and the latter the shaft on which the driving-wheels are mounted or from which the power is transmitted to the driving-wheel shaft.

Figures 18, 19:
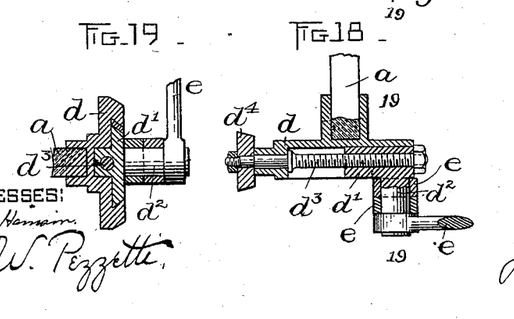
Figs. 18 and 19 represent sections taken on the lines 18 18 and 19 19, respectively, in Fig. 16.

Upon the shaft $a$ is loosely mounted a sleeve $a'$, and loosely mounted relatively to the shaft and sleeve is a drum $c$, having the end wall $c'$ thereof formed into a hub $c^2$, journaled on a reduced end of said sleeve. The drum projects beyond the end of the shaft $a$ and the sleeve $a'$ and is provided with a centrally-arranged spider $c^3$, having its hub journaled upon the hub of a plate $d$, secured upon the end of shaft $a$. The sleeve and the drum are thus both loosely mounted relatively to the driving-shaft $a$ and to each other, so that they may be rotated in opposite directions, and, as will be afterward shown, the driving-shaft will rotate the driven shaft in one direction by means of the drum and in the other direction by means of the said sleeve. On the end of the shaft $a$ which projects a little way beyond the hub of the spider $c^3$ is formed or secured the said plate $d$, having a slideway formed therein, as shown in Figs. 6, 16, 18, and 19. A slide $d'$ is adjustable in the slideway and is formed with a rearwardly-projecting crank-pin $d^2$, said slide $d'$ also having an internally-threaded aperture to receive a screw-shaft $d^3$, journaled in the said plate $d$ and having a beveled friction-wheel $d^4$ secured to one end. By rotating the said wheel $d^4$ the slide may be moved so as to bring the crank-pin in axial alinement with the shaft $a$ or else to force it radially of the said shaft, as shown in Fig. 18.

Figures 5, 6, 7, 11:
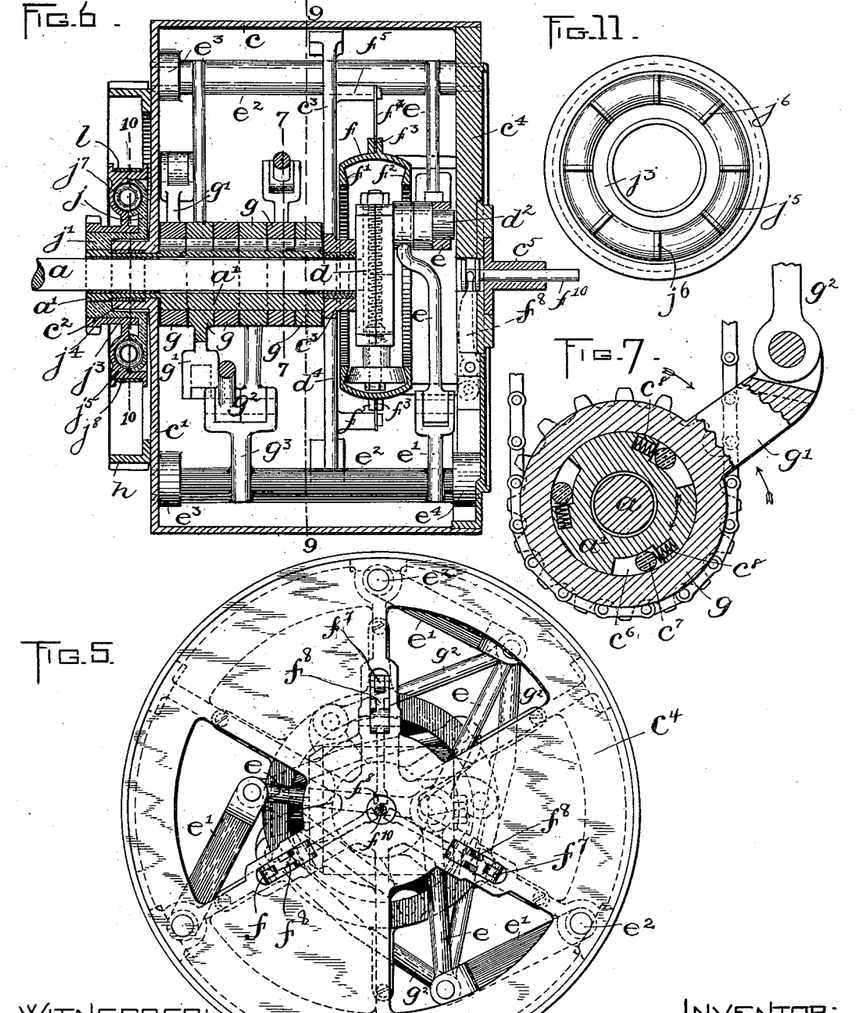
Fig. 5 represents a rear end elevation of the drum and the parts therein confined.
Fig. 6 represents a central longitudinal section through the drum.
Fig. 7 represents a section on line 7 7 of Fig. 6, showing one of the clutches employed for imparting power from the power-shaft.
Fig. 11 represents a face view of one of the halves of the brake-wheel shown in Fig. 10.
Figures 8, 9:
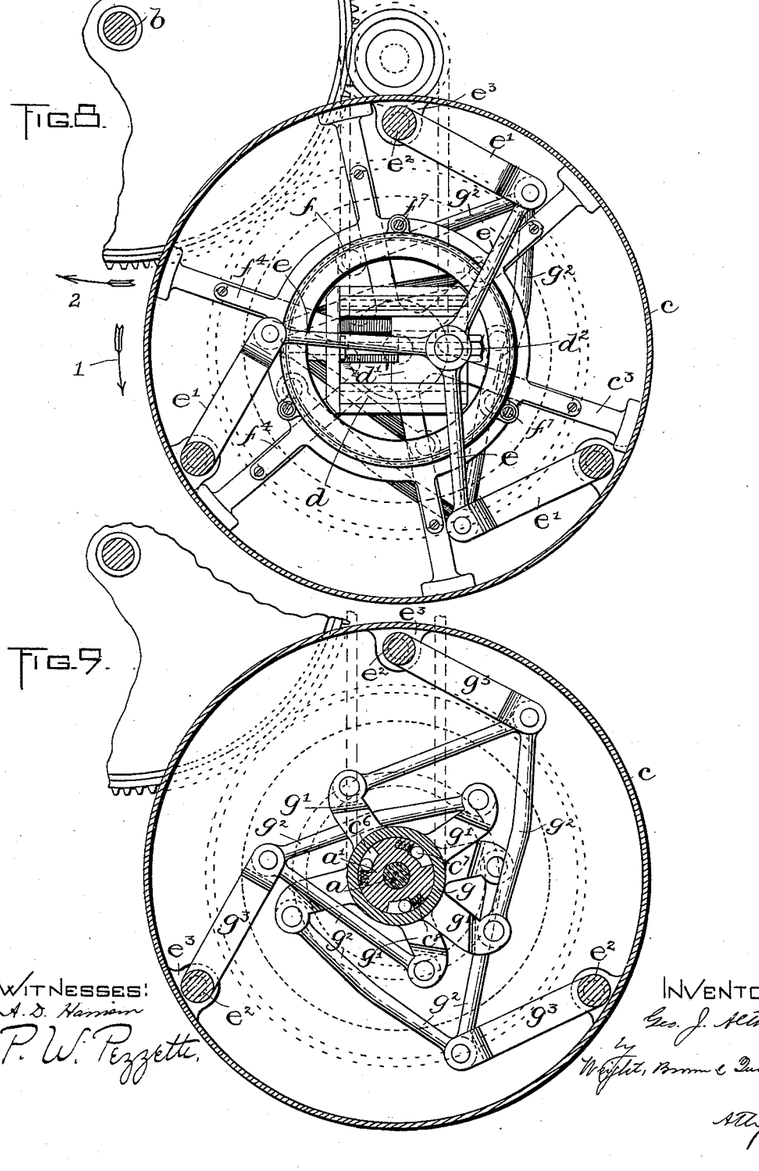
Fig. 8 represents a rear end elevation of the parts mounted within the drum, the end plate of the drum being removed.
Fig. 9 represents a cross-section through the drum, taken on the line 9 9 of Fig. 6.
Figures 14, 15, 16, 17:
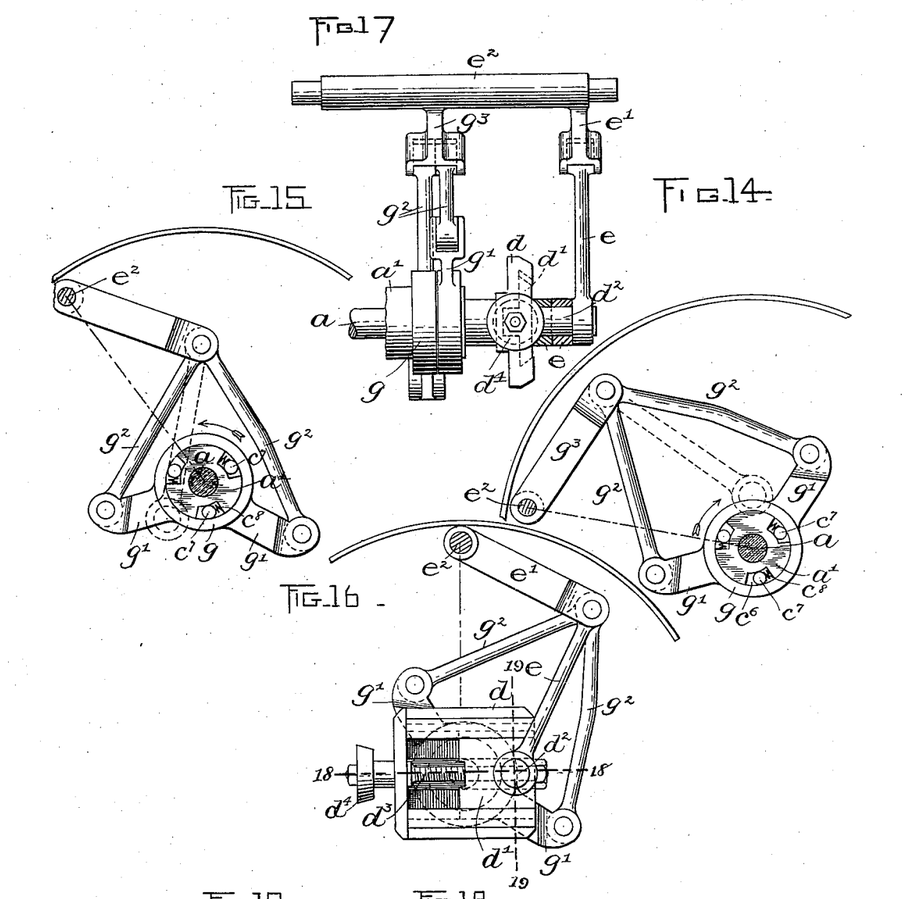
Figs. 14, 15, and 16 represent in different positions the oscillating arms and the clutch-levers which coöperate therewith to transmit power from the power-shaft, Fig. 14 also illustrating the mechanism for varying the speed of the driven shaft.
Fig. 17 represents a front elevation of the parts shown in Fig. 16.

Referring to Fig. 8, in connection with Figs. 16, 18, and 19, it will be seen that I provide three connecting-rods $e\ e\ e$, all pivoted upon the crank-pin $d^2$ and each having its outer end pivoted to an arm $e'$, extending inward from the end of a shaft $e^2$, arranged parallel with the shaft $a$ and journaled in ears $e^3$, extending inward from the cylindrical wall of the drum, and ears $e^4$, extending inward from the flange of the end plate $c^4$ of the drum. Now it will be seen that if the power-shaft $a$ be rotated the movement of the crank-pin will, through the connecting-rods $e$ and the arms $e'$, cause the oscillation of the axially-arranged shafts $e^2$, and that the degree of movement of the rock-shafts $e^2$ may be varied by adjusting the crank-pin in the plate $d$. I accomplish the adjustment of the said pin by means of the following devices:

In connection with the friction-wheel $d^4$ on the screw-shaft $d^3$, which is beveled, I employ a ring $f$, having its opposite flanges or edges $f'\ f^2$ beveled, so that if the power-shaft is rotated and the said ring is moved to cause either of the said beveled edges $f'$ or $f^2$ to impinge against the friction-wheel $d^4$ the said wheel will be rotated and the crank-pin will be moved toward or from the axial line of the shaft $a$, as the case may be. The ring $f$ is secured to a ring $f^3$, of sheet metal, as shown in Figs. 6 and 8, the last-mentioned ring having radially-projecting arms $f^4$, secured to lugs $f^5$, projecting rearwardly from the arms of the spider $c^3$. By reason of the ring $f^3$ being of flexible material the ring $f$ may be moved slightly axially of the shaft $a$ to bring either the flange $f'$ or the flange $f^2$ thereof into engagement with the friction-wheel $d^4$. The wheel $d^4$ and the ring $f$ may be formed with bevel-teeth, if desired. For the purpose of moving the said ring $f$ it is provided with lugs $f^6$, from which pins or rods $f^7$ extend rearwardly and are pivoted to levers $f^8$, fulcrumed in the end plate $c^4$ of the drum. The said levers $f^8$ are arranged radially of the drum and have their lower ends projecting into a grooved wheel $f^9$ on the forward end of a sliding shaft $f^{10}$, journaled in a hub $c^5$, projecting rearwardly from the end plate $c^4$ of the drum. On the rear end of the shaft $f^{10}$ is a grooved wheel $f^{11}$, into which pins $f^{12}$ extend from the forked end of a hand-lever $f^{13}$, fulcrumed at $f^{14}$ on a support $f^{15}$, the last-mentioned parts being illustrated in Fig. 2. By moving the hand-lever $f^{13}$ to the right or to the left the friction-ring $f$ may be thrust into frictional engagement with the wheel $d^4$, so as to adjust the crank-pin with relation to the shaft $a$, and thereby increase or decrease the arc of movement of the rock-shafts $e^2$, as will be readily understood. When the crank-pin is in alinement with the shaft, the rock-shafts are not oscillated, and by gradually adjusting the crank-pin they may be started with a very limited oscillation, which may be increased to a great or maximum extent, as desired.

Upon the sleeve $a'$ are mounted six clutch members or collars $g\ g$, &c., which occupy the space from the spider $c^3$ to the end wall $c$ of the drum, and projecting out from each collar $g$ is an arm $g'$, which is connected by a rod $g^2$ with an arm or lever $g^3$, projecting inward from one of the rock-shafts $e^2$. The said rock-shafts are three in number, as above stated, and are equally spaced in the drum, so that to each arm $g^3$ there are pivoted two diverging connecting-rods $g^2$. Of course it will be understood that the number of clutch members and rock-shafts may be increased or decreased, as desired.

The clutch members or collars $g$ are arranged in pairs, and the arms $g'$ of each pair diverge, as shown in Figs. 14 to 16, so that the rods $g^2$ extend from their pivotal points in the arms $g^3$ to opposite sides of the collars. The said sleeve $a'$ is provided with longitudinal slots $c^6$, the bottom walls of which are eccentric to the interior walls of the collars $g$, and in the cavities thus formed are placed rolls $c^7$, which are normally forced forward by springs $c^8$ to frictionally connect each collar with the sleeve, the last-mentioned parts being more particularly shown in Fig. 7. Now then when the rock-shafts $e^2$ are rocked the arms or levers $g^3$ are oscillated, and the collars $g$ of each pair are partially rotated in opposite directions about the sleeve $a'$. Hence when one of the arms $g^3$ moves in a direction toward the sleeve $a'$ one of the collars is clutched to the sleeve $a'$ to move it, while the other collar moves relatively thereto, and when the lever or arm $g^3$ is moving in the opposite direction the collar $g$ which was operative during the first movement is inoperative during this movement and the other collar $g$ operates to force the sleeve $a'$ farther around in its rotation. Inasmuch, however, as the three rock-shafts $e^2$ are placed at equal distances about the central power-shaft $a$ the revolution of the crank-pin will cause the oscillations of the said rock-shafts to occur successively, and hence only one of the clutches operates at a time, and, moreover, effects a forward rotation of the sleeve or the drum only for a brief interval during the central portion of its movement. The central portion of the inward movement of each arm $g^2$ is at a maximum or greater rate of speed than the remainder of its movement, and hence by having the clutches operate successively during the central portion of this movement the next clutch engages the sleeve just prior to the preceding clutch releasing it, and in that way the rotation of the sleeve or drum is practically constant. Of the clutches one is always operating, so that there is no time that the sleeve or drum is not being driven.

By reason of the drum and the sleeve being loose relatively to each other I am enabled to cause through the operation of the clutches the rotation of the drum in one direction if the sleeve is held stationary to act as an abutment for the clutches or the rotation of the sleeve in the opposite direction if the drum be held substantially stationary.

The movement of the drum and of the sleeve may be alternately imparted to the driven shaft $b$ through the medium of the devices to be now described. On the end wall $c'$ of the drum is secured an externally-toothed ring or gear-wheel $h$, which intermeshes with the toothed gear-wheel $i$, rigidly secured upon the driven shaft $b$.

Figures 1, 2, 10:
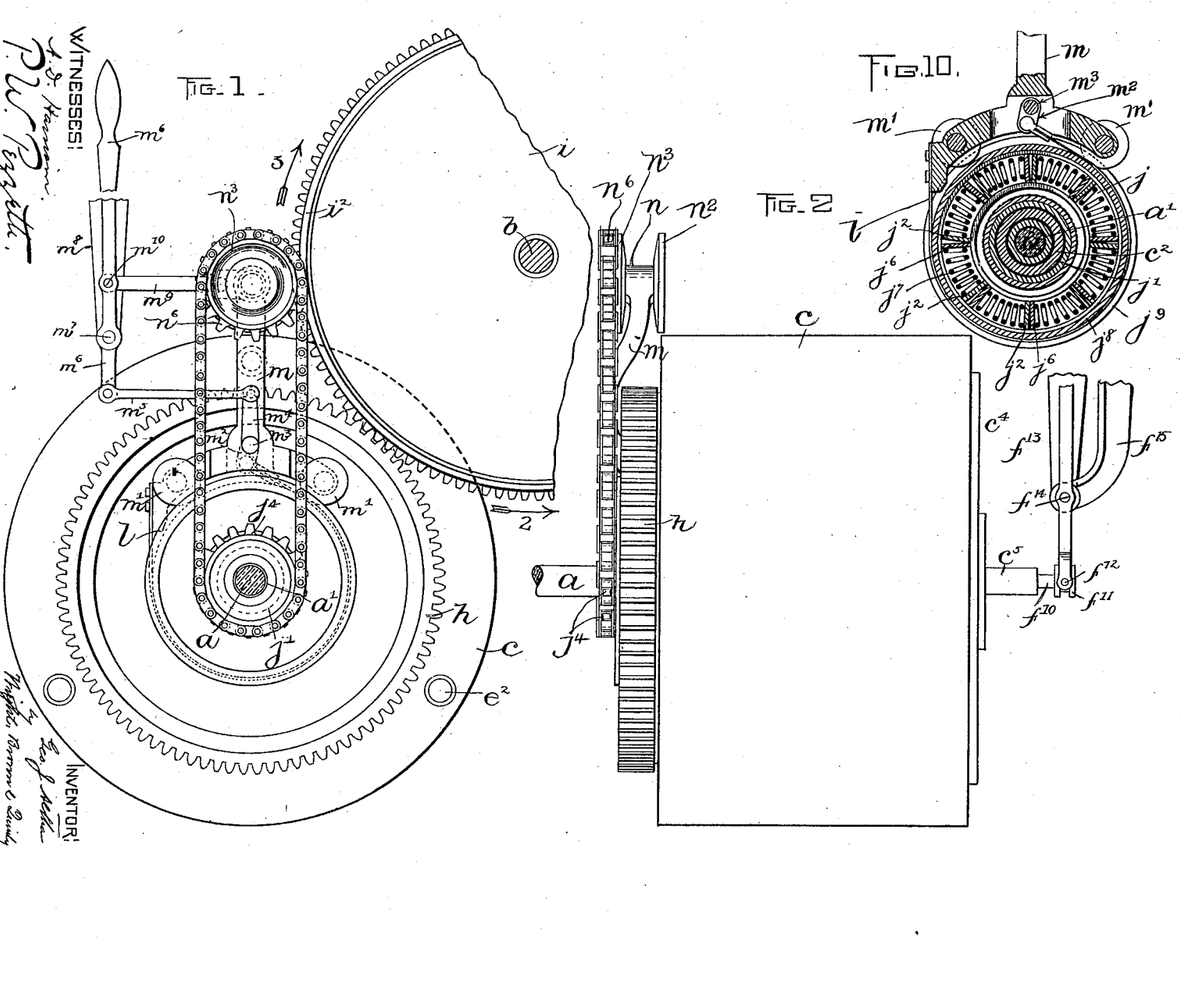
Figure 1 represents in side elevation one form of transmitter in which my invention is embodied, the driving and driven shafts being both in section.
Fig. 2 represents the same in front elevation, with the exception that the driven shaft and the wheel by which power is imparted thereto are omitted for the sake of clearness.
Fig. 10 represents a sectional view of the cushioning and the brake mechanism which is employed for the purpose of reversing the rotation of the driven shaft, as will be hereinafter fully explained.

On the end of the sleeve $a'$ is rigidly secured a disk $j$, having a hub $j'$. The disk is formed with a concentric groove, which is semicircular in cross-section and which is provided with stops or webs $j^2$, projecting therefrom, as shown in Fig. 10. Placed upon the hub $j'$ is a hub $j^3$, formed on one end with a pinion $j^4$ and on the other end with a disk $j^5$, confronting the disk $j$ and having a groove corresponding to the groove in the disk $j$, as shown in Figs. 6 and 11. The said disk $j^5$ is also provided with projecting webs or stops $j^6$, so that when the two disks are placed side by side their grooves form a circle and the webs or stops $j^6$ and $j^2$ overlap each other, as shown in Fig. 10. Then in the sockets in the ring formed by the two grooves is placed a series of coiled springs $j^7$, each having one end abutting against a web or stop $j^2$ and its other abutting against a web or stop $j^6$. The hub $j^3$ is loose upon the hub $j'$, but the two are locked together by the springs, which act as cushions, to insure that the gear-wheel $j^4$ is driven with a constant speed and to equalize any slight inequality of movement that may be transmitted to the sleeve $a'$ by the clutches. The disk $j^5$ is extended laterally at its outer end to form a band or brake wheel $j^8$, with two flanges $j^9$ on its peripheral edges, as shown in Figs. 1, 6, 10, and 11.

Figures 3, 4, 12, 13:
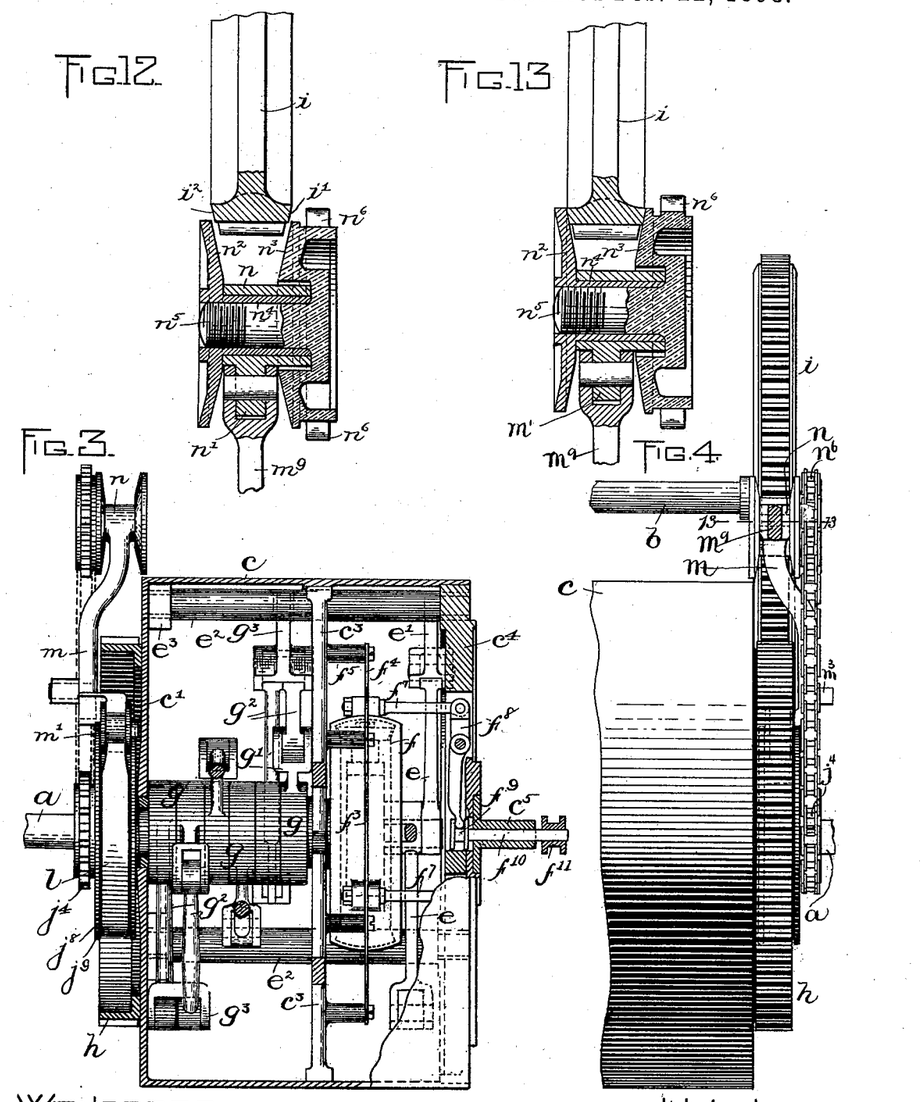
Fig. 3 illustrates the clutch and other mechanism confined in the drum, which latter is shown in section, and the mechanism for imparting power to the wheel on the driven shaft.
Fig. 4 represents a rear elevation of the end of the drum and the adjacent mechanism.
Figs. 12 and 13 represent in section the sprocket-wheel, which may be thrust into frictional engagement with a gear-wheel on the driven shaft.

The brake-strap $l$ is passed under the brake-wheel and has one end attached to the lower arc-shaped end of a support $m$, which support is provided with two rollers $m'$, resting upon the wheel $j^8$ near one end thereof, as shown in Fig. 3. The other end of the strap is attached to a lever $m^2$, mounted on a shaft $m^3$, journaled in the support $m$. (See Fig. 10.) The outer end of the shaft $m^3$ is provided with an arm $m^4$, so that by rocking said arm the band or brake strap $l$ may be caused to tightly engage the band-wheel or to release it, as desired. The outer end of the arm $m^4$ is connected by a rod $m^5$ with the lower end of a hand-lever $m^6$, pivoted at $m^7$ on a stationary support $m^8$, so that the brake-wheel and therefore the sleeve $a'$ may be locked against rotation by throwing the said hand-lever $m^6$ to the left. The upper end of the support $m$ is formed into a bearing-sleeve $n$, in which is journaled a friction-wheel provided with sprocket-teeth, as shown in Figs. 12 and 13. The said friction-wheel consists of two beveled disks $n^2$ and $n^3$, the former having an internally-threaded hub $n^4$ to receive a threaded pin $n^5$, formed on the disk $n^3$. The hub $n^4$ is journaled in the bearing $n$, so that when the pin $n^5$ has been screwed into the hub of the disk $n^2$ the friction-wheel is securely mounted in place. The disk $n^3$ is provided with a circumferential flange, upon which are formed the sprocket-teeth $n^6$, and between the sprocket-wheel thus formed and the sprocket-wheel $j^4$, formed on the hub $j^3$, extends an endless sprocket-chain $n^7$, as shown in Figs. 1 and 3.

The gear-wheel $i$, which, as before stated, intermeshes with the gear-wheel $h$ on the drum $c$, is beveled, as at $i'$ $i^2$, so as to project at times between the beveled inner face of the disks $n^2$ $n^3$, as shown in Figs. 12 and 13, in frictional engagement therewith. The bearing-sleeve $n$ is provided with an outwardly-projecting lug $n'$, to which is pivoted a rod $m^9$, also pivoted at $m^{10}$ to the hand-lever $m^6$. Now it will be seen that by swinging the hand-lever $m^6$ to the right the connecting-rod $m^9$ will force the friction-wheel into engagement with the gear-wheel $i$ and will release the brake mechanism, and if it be thrown by the hand-lever $m^6$ to the left the friction-wheel will be thrown out of engagement with the gear-wheel and the brake-strap will lock the brake-wheel and the sleeve $a'$ against movement.

I will now proceed to describe the operation of the transmitter. Let it be assumed that the power-shaft $a$ is rotated continuously in one direction and that the crank-pin $d^2$ is exactly in alinement with the shaft $a$ and that therefore the drum and the sleeve $a'$ are both stationary. Now by means of the lever $f^{13}$ the friction-ring $f$ is thrust against the wheel $d^4$, which is being revolved about the axis of the shaft $a'$, the said ring being held in engagement therewith until it has caused it to rotate about its axis sufficiently to adjust the crank-pin out of the central axial line of the shaft $a'$. Thereupon the crank-pin, through the connecting-rods $e$ and the arms $e'$, imparts a continuous rocking movement to the rock-shafts $e^2$, the hand-lever $m^6$ having been previously shifted so as to lock the band-wheel and the sleeve $a'$ against rotation and to also withdraw the friction-wheel from the gear-wheel $i$. The rocking of the shafts $e^2$ will, through the clutch mechanisms on the sleeve $a'$, rotate the drum in the direction of the arrow 1 in Fig. 8 and will, through the gear-wheel $h$, rotate the gear-wheel $i$ in the direction of the arrow 2 in Figs. 1 and 8. The speed with which the drum is revolved may be increased by forcing the crank-pin farther away from the central axial line of the shaft $a$ by the mechanism operated through the lever $f^{13}$. In order to stop the rotation of the drum gradually, the crank-pin may be adjusted so as to be in alinement with the shaft $a$ by throwing the ring $f$ into engagement with the wheel $d^4$ to rotate the screw in the direction opposite to which it is rotated in forcing the crank-pin away from the shaft. In order to reverse the direction of rotation of the driven shaft $b$ and the gear-wheel $i$, the hand-lever $m^6$ is thrown to the right, so as to release the sleeve $a'$ and to force the friction-wheel into engagement with the gear-wheel $i$. The crank-pin having been again adjusted to cause the oscillation of the rock-shafts $e^2$, the clutch mechanism will operate to rotate the sleeve, which through the sprocket-wheel $j^4$, the chain $n^7$, the sprocket-wheel $n^6$, and the friction-wheel on which the sprocket-wheel $n^6$ is formed will rotate the gear-wheel $i$ in the direction of the arrow 3. During this time the gear-wheel $i$ is still intermeshed with the gear-wheel $h$ on the drum and acts as an abutment to resist the thrust of the levers $g^3$, the connecting-rods $g^2$, and the clutches in rotating the shaft; but the rotation of the drum, by reason of the intermeshing of the gears $h$ and $i$, will be so relatively slow as not to affect the rotation of the sleeve, which is correspondingly rapid. Of course it is necessary that in order for the sleeve to be rotated the clutches must operate against an abutment, just as the sleeve must be locked in order to rotate the drum about it, and therefore the slow rotation of the drum in the same dirction in which the sleeve is being rotated tends only to increase the speed of the sleeve. The drum is caused to rotate in the same direction as the power-shaft when it is propelling the carriage forward, and I am thereby enabled to obtain a very important result. If the clutches were removed and the drum held stationary, the rock-shafts would be oscillated once for each rotation of the power-shaft, whereas when the clutches are operating and the drum is rotating in the direction of the power-shaft the oscillations decrease in number, since the greater the speed of rotation the less in number are the oscillations of the rock-shafts. By reason of this arrangement I am enabled to reduce the wear of the parts and am also enabled to prevent, in a large measure, a corresponding increase in the inertia of the moving parts. The mechanism acts as a "slowing-down" gearing, and even when the drum is rotating at its maximum speed the driven shaft rotates at a rate one-third of the speed of the power-shaft. The drum likewise acts as a momentum or fly wheel to assist in forcing the vehicle over a small stone or other obstruction and renders the use of an additional fly-wheel unnecessary, and, moreover, by employing the cushioning devices—i. e., the brake-wheel provided with the springs for locking the sleeve and forming a yielding abutment for the clutches to operate the drum—the motor is not affected by the vehicle meeting an ordinary obstruction. The drum is employed for driving the vehicle forward, since it is in that direction that it is necessary to attain any great amount of speed, whereas the sleeve is rotated for the purpose of backing the vehicle, or as a brake for the friction-wheel which engages the gear-wheel $i$ may be employed to check its rotation and rapidly bring it to a state of rest. This is an important feature of the invention, as if the vehicle be traveling forward at a high rate of speed it may be halted or stopped by merely reversing the hand-lever $m^6$ and throwing the drum out of operation and throwing the sleeve $a'$ into operation. The friction-wheel which engages the wheel $i$ is of relatively small diameter, as it is unnecessary to have the vehicle back at any great rate of speed and as it is seldom necessary to back a motor-vehicle for more than a few moments at a time.

I claim—

1. A power-transmitter, comprising a constantly-rotating power-shaft, a reversible driven shaft, means for imparting power from the power-shaft to the driven shaft, said means including clutches that are operative in but one direction and devices for regulating the speed of the driven shaft, and devices for reversing the direction of rotation of the driven shaft.

2. A power-transmitter, comprising a constantly-rotating power-shaft, a reversible driven shaft, means driven by the power-shaft and including clutches that are adapted to operate in but one direction for rotating the driven shaft, means for varying the speed of the driven shaft from zero to maximum, and means for reversing the direction of rotation of the driven shaft.

3. A power-transmitter, comprising a constantly-rotating power-shaft, a driven shaft, means driven by the power-shaft for rotating the driven shaft, said means including clutches and a screw-shaft for varying their throw the clutches being operative in but one direction for gradually varying the speed of the driven shaft from substantially zero to maximum, and devices for disconnecting the driven shaft from the power-shaft.

4. A power-transmitter comprising a shaft, reciprocating clutches on the shaft, said clutches being operative in but one direction, means operated by the driving-shaft for actuating said clutches, and a controllable screw-shaft having connections for varying the degree of movement of the clutches.

5. A power-transmitter comprising a shaft, and a sleeve thereon, clutches on the sleeve and having diverging arms, reciprocating means actuated from the shaft within the sleeve, and rods connecting said diverging arms with said means, for the purpose set forth.

6. A power-transmitter comprising a shaft, and a sleeve thereon, clutches on the sleeve and having diverging arms, reciprocating means actuated from the shaft within the sleeve, rods connecting said diverging arms with said means, and means for varying the movement of the said diverging arms.

7. A power-transmitter comprising a shaft, a sleeve on the shaft, oscillatory clutch members on the sleeve, means for oscillating said clutch members simultaneously in opposite directions, and means operated by the shaft within the sleeve for actuating said means.

8. A power-transmitter comprising a continuously-rotating driving-shaft, a driven shaft, rotatable in opposite directions with varying speed, oppositely-reciprocating clutches that are operative in but one direction for imparting power to said driven shaft, means for varying the movement of said clutches, and means for reversing the direction of rotation of said driven shaft, without altering the operation of the clutches.

9. A power-transmitter comprising a continuously-rotating driving-shaft, a driven shaft rotatable in opposite directions with varying speed, oppositely-reciprocating clutches that are operative in but one direction for imparting power to said driven shaft, means for varying the movement of said clutches, means for reversing the direction of rotation of said driven shaft without altering the operation of the clutches, and cushions placed between the clutches and the driven shaft.

10. A power-transmitter comprising a driving-shaft, a driven shaft, a sleeve on the driving-shaft, a drum on the driving-shaft, clutch mechanism connecting the sleeve and drum, said sleeve and said drum being rotatable in opposite directions and adapted to be connected to said driven shaft, and a crank carried by said driving-shaft for operating the clutch mechanism.

11. A power-transmitter comprising a driving-shaft, a driven shaft, a drum loose on the driving-shaft, a sleeve also loose on the driving-shaft, said sleeve and said drum being each adapted to rotate the driven shaft, and clutch mechanism operated by the driving-shaft for rotating the drum relatively to the sleeve or rotating the sleeve relatively to the drum.

12. A power-transmitter comprising a driving-shaft, a driven shaft, a drum loose on the driving-shaft, a sleeve also loose on the driving-shaft, said sleeve and said drum being each adapted to rotate the driven shaft, and clutch mechanism operated by the driving-shaft for rotating the drum in one direction relatively to the sleeve, or rotating the sleeve in the other direction relatively to the drum.

13. A power-transmitter comprising a driving-shaft, a driven shaft, a drum loose on the driving-shaft, a sleeve also loose on the driving-shaft, said sleeve and said drum being each adapted to rotate the driven shaft, and clutches operated by the driving-shaft for rotating the drum in one direction relatively to the sleeve, or rotating the sleeve in the other direction relatively to the drum.

14. A power-transmitter comprising a driving-shaft, a sleeve loose on said shaft, a drum loose on said shaft, a driven wheel adapted to be driven in one direction by said sleeve and in the other direction by the drum, clutch mechanism operated by the driving-shaft for driving the sleeve in one direction and the drum in the other direction, and controlling means for causing either said drum or said sleeve to act as an abutment for effecting the rotation of the other.

15. A power-transmitter comprising a driving-shaft, a driven shaft, a sleeve on the driving-shaft, a drum on the driving-shaft, said sleeve and said drum being rotatable in opposite directions and adapted to be connected to said driven shaft, and means for varying the speed of the drum or the sleeve relatively to the speed of the driving-shaft.

16. A power-transmitter comprising a driving-shaft, a driven shaft, a drum loose on the driving-shaft, a sleeve also loose on the driving-shaft, said sleeve and said drum being each adapted to rotate the driven shaft, means operated by the driving-shaft for rotating the drum in one direction relatively to the sleeve, or rotating the sleeve in the other direction relatively to the drum, and means for varying the speed of the drum or the sleeve relatively to the speed of the driving-shaft.

17. A power-transmitter comprising a driving-shaft, a drum loose relatively to the said shaft, a driven clutch member arranged in the drum, and an oscillatory clutch member operated by the driving-shaft and coacting with the said driven clutch member for rotating said drum.

18. A power-transmitter comprising a driving-shaft, a drum loose relatively to the said shaft, a driven clutch member arranged in the drum, an oscillatory clutch member adapted to coact with the said driven clutch member, and means operated by the driving-shaft and supported by the drum for actuating the oscillatory clutch member and thereby rotating the drum.

19. A power-transmitter comprising a driving-shaft, a drum loose relatively to the said shaft, a driven clutch member arranged in the drum, an oscillatory clutch member adapted to coact with the said driven clutch member, a crank-pin on the driving-shaft, and means supported by the drum and operated by the said crank-pin for oscillating the clutch members to rotate the shaft.

20. A power-transmitter comprising a driving-shaft, a drum loose relatively to the said shaft, a driven clutch member arranged in the drum, an oscillatory clutch member operated by the driving-shaft and coacting with the said driven clutch member, and controlling means for varying the range of movement of the oscillatory clutch member.

21. A power-transmitter comprising a driving-shaft, a drum loose relatively to the said shaft, a driven clutch member arranged in the drum, an oscillatory clutch member adapted to coact with the said driven clutch member, a crank-pin on the driving-shaft, means supported by the drum and operated by the said crank-pin for oscillating the clutch members to rotate the shaft, and means for adjusting the crank-pin axially of its shaft to vary the range of movement of the oscillatory clutch member.

22. A power-transmitter comprising a driving-shaft, a plurality of pairs of oscillatory clutch members, rotatable clutch members driven by said oscillatory clutch members, the coöperating members being mounted concentric with the axis of the driving-shaft, and means operated by the driving-shaft for successively operating the different pairs of oscillatory clutch members.

23. A power-transmitter comprising a driving-shaft, a plurality of pairs of oscillatory clutch members, rotatable clutch members driven by said oscillatory clutch members, the coöperating members being mounted concentric with the axis of the driving-shaft, a lever for operating each pair of said oscillatory clutch members, and means driven by the driving-shaft for successively operating the levers.

24. A power-transmitter comprising a series of rotatable clutch members, a series of oscillatory clutch members all independent of each other and mounted concentric with the axis of the driving-shaft, and means for causing said clutches to act successively.

25. A power-transmitter comprising a driving-shaft, a driven shaft, a series of rotatable clutch members connected with the driven shaft, a series of independent oscillatory clutch members, the coöperating members being mounted concentric with the axis of the driving-shaft, and means operated by the driving-shaft for actuating said oscillating clutch members to cause their successive operation.

26. A power-transmitter comprising a driving-shaft, a driven shaft, a series of oscillatory clutches mounted concentric with the axis of the driving-shaft, a series of levers each connected to one of the clutches, said levers having their pivot equidistant from the clutches, and from each other, a crank driven by the driving-shaft, and connections between the crank-pin and the levers.

27. A power-transmitter comprising a driving-shaft, a driven shaft, a series of pairs of oppositely-acting clutches for operating the driven shaft, said clutches being mounted concentric with the axis of the driving-shaft and means including a crank on the driving-shaft, for operating said clutches successively.

28. A power-transmitter comprising a driving-shaft, a driven shaft, a series of oscillatory clutches concentric with the driving-shaft and having connections for driving the driven shaft, an adjustable crank-pin, and connections between said pin and said clutches.

29. A power-transmitter comprising a driving-shaft, a driven shaft, a series of oscillatory clutches concentric with the driving-shaft and having connections for driving the driven shaft, devices for oscillating the clutches, a crank on the driving-shaft, an adjustable pin on said crank for actuating said devices, and means for adjusting said crank-pin.

30. A power-transmitter comprising a friction-wheel having gear-teeth, a gear-wheel in mesh with said wheel for rotating it in one direction, and a movable friction-wheel having means for rotating it in a direction which is adapted to rotate the first-mentioned wheel in the other direction, when the two are brought together.

31. A power-transmitter comprising a gear-wheel having beveled friction edges, a gear-wheel in mesh with the teeth of said wheel for rotating it, and a movable friction-wheel having means for rotating it positively and adapted to engage said beveled edges of said first-mentioned wheel for rotating it.

In testimony whereof I have signed my name to this specification, in the presence of two subscribing witnesses, this 22d day of March, A. D. 1897.

GEORGE J. ALTHAM.

Witnesses:
 A. D. HARRISON,
 P. W. PEZZETTI.